US009780538B2

(12) United States Patent
Lee

(10) Patent No.: US 9,780,538 B2
(45) Date of Patent: Oct. 3, 2017

(54) VOLTAGE POWER CIRCUIT BREAKER DUAL COMPARTMENT MODULE

(71) Applicant: SCHNEIDER ELECTRIC USA, INC., Schaumburg, IL (US)

(72) Inventor: Gregory Brent Lee, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/900,285

(22) PCT Filed: Jun. 28, 2013

(86) PCT No.: PCT/US2013/048487
§ 371 (c)(1),
(2) Date: Dec. 21, 2015

(87) PCT Pub. No.: WO2014/209342
PCT Pub. Date: Dec. 31, 2014

(65) Prior Publication Data
US 2016/0204582 A1 Jul. 14, 2016

(51) Int. Cl.
*H02B 1/20* (2006.01)
*H02B 1/32* (2006.01)
(Continued)

(52) U.S. Cl.
CPC ............... *H02B 1/32* (2013.01); *H02B 1/20* (2013.01); *H02B 11/00* (2013.01); *H02B 13/01* (2013.01); *H02B 13/025* (2013.01)

(58) Field of Classification Search
CPC . H02B 1/32; H02B 1/20; H02B 1/205; H02B 1/207; H02B 1/21; H02B 11/00; H02B 13/01025
(Continued)

(56) References Cited

U.S. PATENT DOCUMENTS

| 3,469,149 A | 9/1969 | Paape |
| 4,136,374 A | 1/1979 | Rosey et al. |

(Continued)

FOREIGN PATENT DOCUMENTS

WO 2012066316 A1 5/2012

OTHER PUBLICATIONS

International Search Report and Written Opinion for PCT/US13/48487 mailed Nov. 22, 2013, 12pp.

*Primary Examiner* — Zachary M Pape
(74) *Attorney, Agent, or Firm* — Locke Lord LLP

(57) ABSTRACT

A switchgear/board cabinet is constructed using a dual compartment module (100) that includes an equipment compartment (200) and a bus compartment (300) arranged behind the equipment compartment. The bus compartment includes line connection buses (310) and load connection buses (320) for a plurality of phases, spaced-apart vertical interphase barriers (330), a horizontal support barrier (340) and a rear barrier (350) forming a back wall. Each of the vertical interphase barriers extends from a front to a back of the bus compartment, and isolates the load connection bus and line connection bus of each phase from the load connection bus and line connection bus of the other of the phases. The horizontal support barrier extends from the front to the back of the bus compartment, and supports the line connection buses. Any number of dual compartment modules may be constructed and stacked to provide a customized switchgear/board cabinet.

17 Claims, 10 Drawing Sheets

(51) Int. Cl.
*H02B 11/00* (2006.01)
*H02B 13/01* (2006.01)
*H02B 13/025* (2006.01)

(58) Field of Classification Search
USPC .................................. 361/611–612, 624
See application file for complete search history.

(56) References Cited

U.S. PATENT DOCUMENTS

| | | | |
|---|---|---|---|
| 4,677,524 A | 6/1987 | Shiraishi et al. | |
| 4,814,942 A * | 3/1989 | Robirds | H02B 11/133 200/50.17 |
| 4,862,324 A | 8/1989 | Kalvaitis et al. | |
| 5,801,331 A | 9/1998 | Zachrai | |
| 5,905,631 A | 5/1999 | Winkler | |
| 6,040,538 A | 3/2000 | French et al. | |
| 6,141,206 A | 10/2000 | Bruner et al. | |
| 6,362,445 B1 | 3/2002 | Marchand et al. | |
| 6,410,844 B1 * | 6/2002 | Bruner | H02B 13/025 174/17 VA |
| 6,452,785 B1 | 9/2002 | Kaaden et al. | |
| 6,488,214 B1 * | 12/2002 | Nicolai | H02B 1/565 165/80.2 |
| 6,489,567 B2 * | 12/2002 | Zachrai | H02G 5/025 174/149 B |
| 6,509,522 B1 | 1/2003 | Okabe et al. | |
| 6,516,955 B1 | 2/2003 | Dudhwala et al. | |
| 6,762,386 B2 | 7/2004 | Itou et al. | |
| 6,957,170 B2 | 10/2005 | Laurosch et al. | |
| 7,278,889 B2 | 10/2007 | Muench et al. | |
| 7,329,813 B2 | 2/2008 | Josten et al. | |
| 7,492,062 B1 | 2/2009 | Wristen et al. | |
| 7,719,823 B2 * | 5/2010 | Josten | H02B 1/14 174/129 B |
| 7,791,862 B2 | 9/2010 | Mathes et al. | |
| 7,952,857 B1 | 5/2011 | Motley et al. | |
| 7,969,744 B2 | 6/2011 | Mathes et al. | |
| 8,207,621 B2 | 6/2012 | Hunter | |
| 8,242,395 B2 * | 8/2012 | Josten | H02B 13/025 200/306 |
| 9,007,746 B2 * | 4/2015 | Rajvanshi | H05K 7/20581 165/104.33 |
| 2009/0200273 A1 | 8/2009 | Josten et al. | |
| 2010/0096962 A1 | 4/2010 | Rajvanshi et al. | |

* cited by examiner

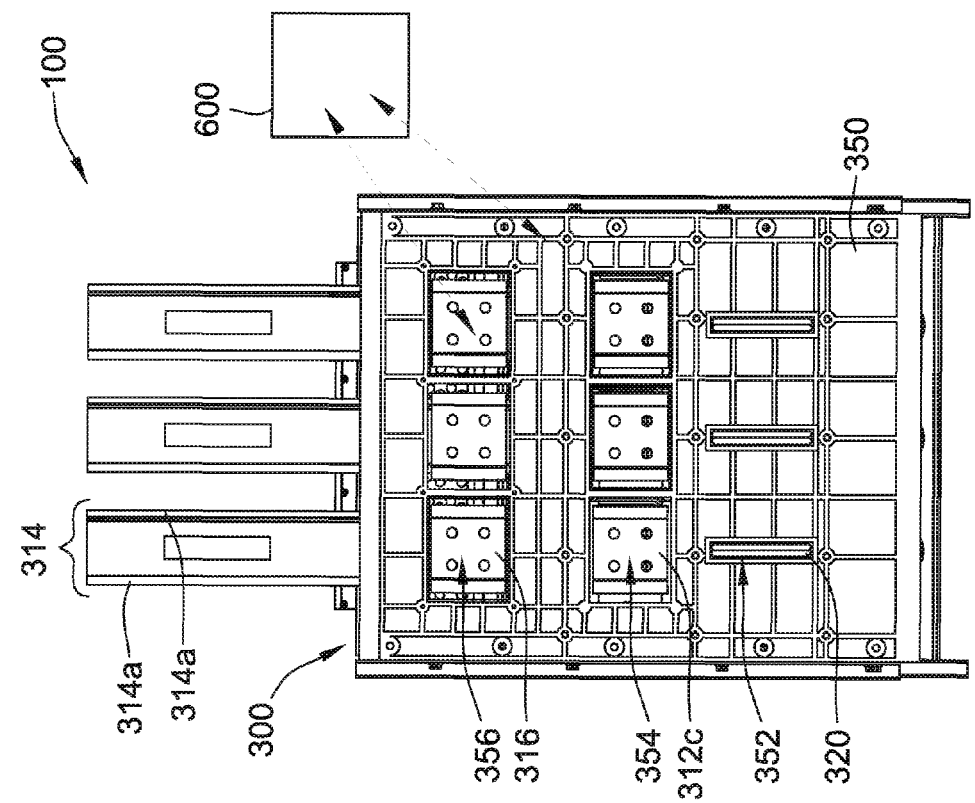
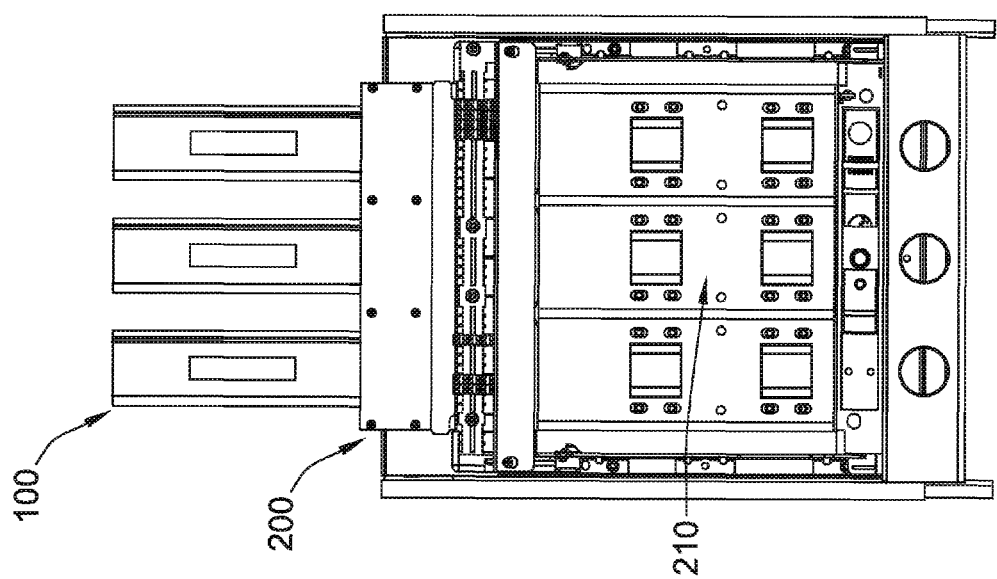

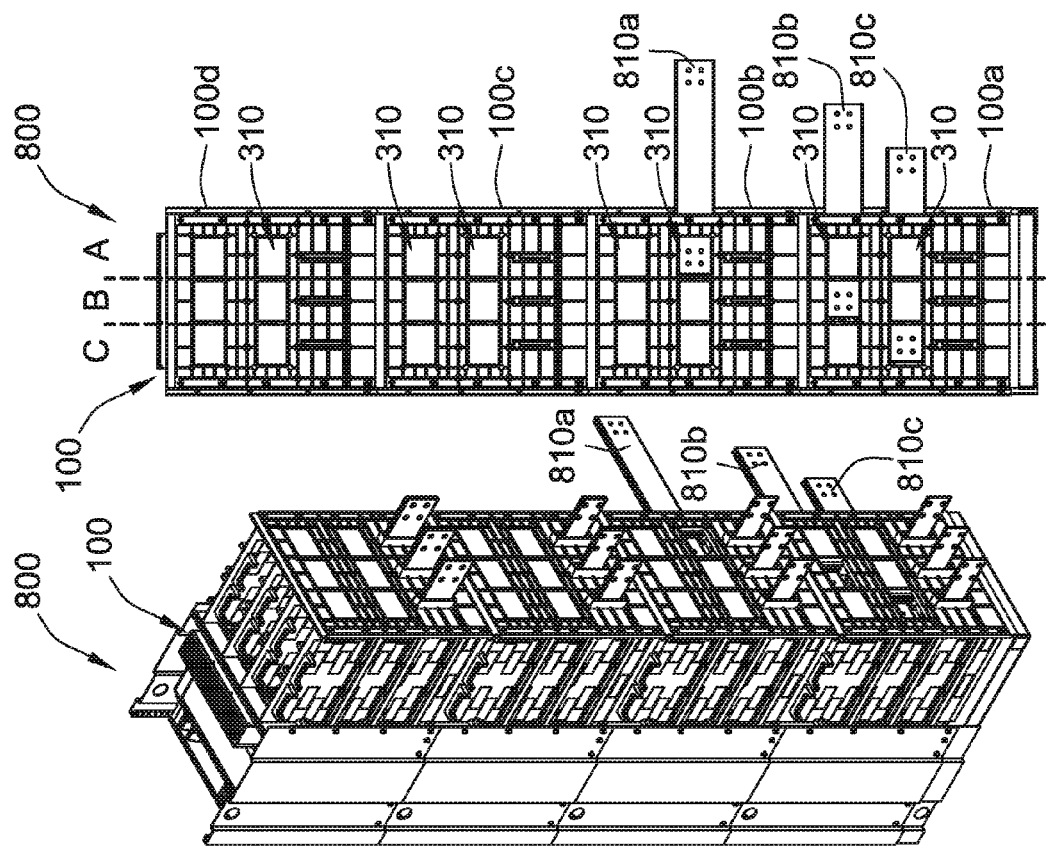
FIG. 11
FIG. 10
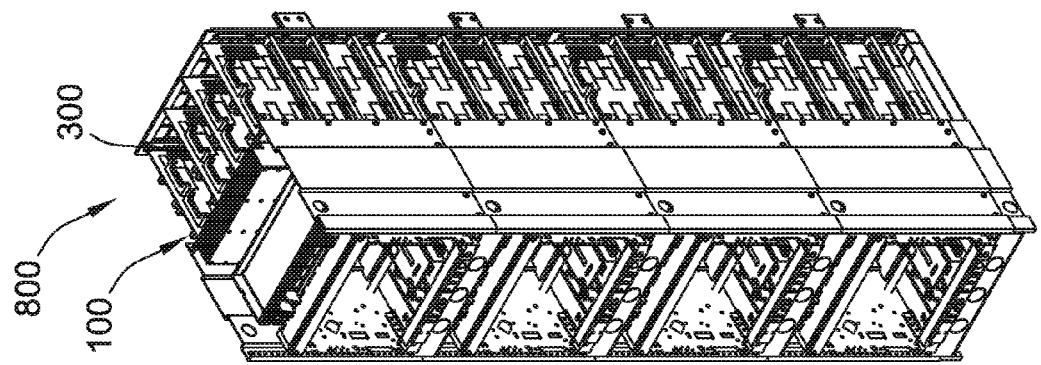
FIG. 9
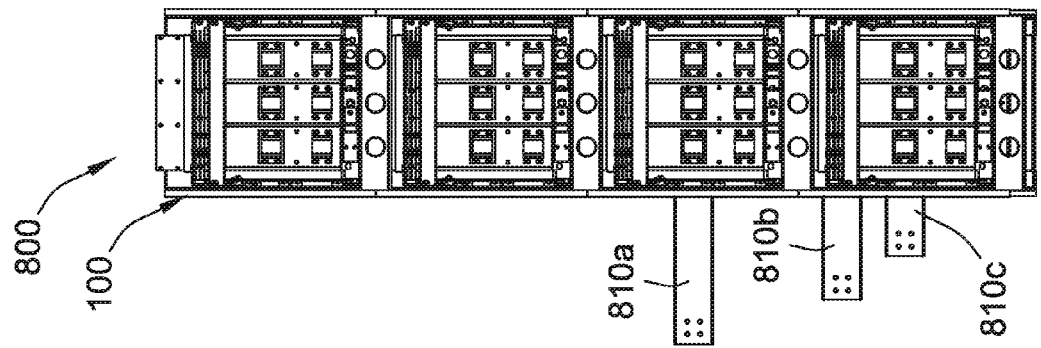
FIG. 8

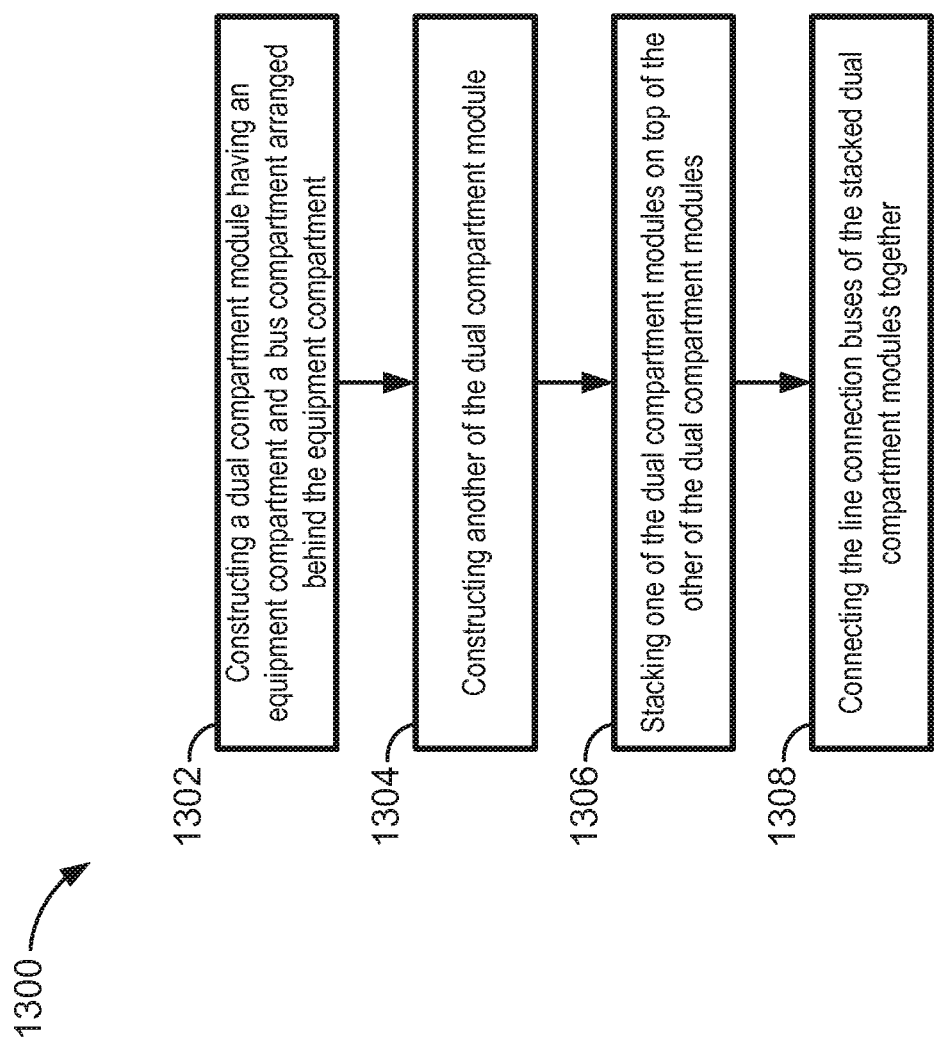

VOLTAGE POWER CIRCUIT BREAKER DUAL COMPARTMENT MODULE

FIELD

The present disclosure relates to the field of switching equipment, and more particularly, to a dual compartment module for constructing a switchgear/board cabinet.

BACKGROUND

A switchgear/board cabinet includes an equipment compartment, a bus compartment and a cable compartment. When constructing the cabinet, each compartment is individually assembled into a complete vertical unit, and then connected together with the other compartments. Thus, it is difficult to modify a switchgear/board cabinet or to produce it quickly in accordance with customer specifications. Furthermore, arcing between phase conductors inside the cabinet may result in damage or destruction to the switchgear/board cabinet, and may even result in injury to operating personnel.

SUMMARY

To overcome these shortcomings, and thus, to facilitate construction of a switchgear/board cabinet to protect against the occurrence of arcing between the phase conductors in the cabinet, the cabinet is constructed, in accordance with one exemplary embodiment of the present disclosure, using a dual compartment module that includes an equipment compartment and a bus compartment having interphase barriers for isolating connection buses of each phase. The dual compartment module is stackable, which makes it easier to produce cabinets of varying heights.

In accordance with one embodiment, a switchgear/board cabinet is constructed using a dual compartment module that includes an equipment compartment and a bus compartment arranged behind the equipment compartment. The bus compartment includes a rear barrier forming a back wall of the bus compartment, line connection buses and load connection buses for a plurality of phases, spaced-apart vertical interphase barriers and a horizontal support barrier. Each of the vertical interphase barriers extends from a front to a back of the bus compartment, and isolates the load connection bus and line connection bus of each phase from the load connection bus and line connection bus of the other of the phases. The horizontal support barrier extends from the front to the back of the bus compartment, and supports the line connection buses.

BRIEF DESCRIPTION OF THE DRAWINGS

The description of the various exemplary embodiments is explained in conjunction with the appended drawings, in which:

FIG. 5 illustrates a frontal view of the dual compartment module of FIG. 1;

FIG. 6 illustrates a rear view of the dual compartment module of FIG. 1;

FIGS. 8, 9, 10 and 11 illustrate different perspective views of stacked dual compartment modules of FIG. 1 of a switchgear/board cabinet;

FIG. 13 illustrates an exemplary process by which to construct a switchgear/board cabinet using the dual compartment module of FIG. 1, in accordance with another embodiment of the present disclosure.

DETAILED DESCRIPTION

Figure 1:
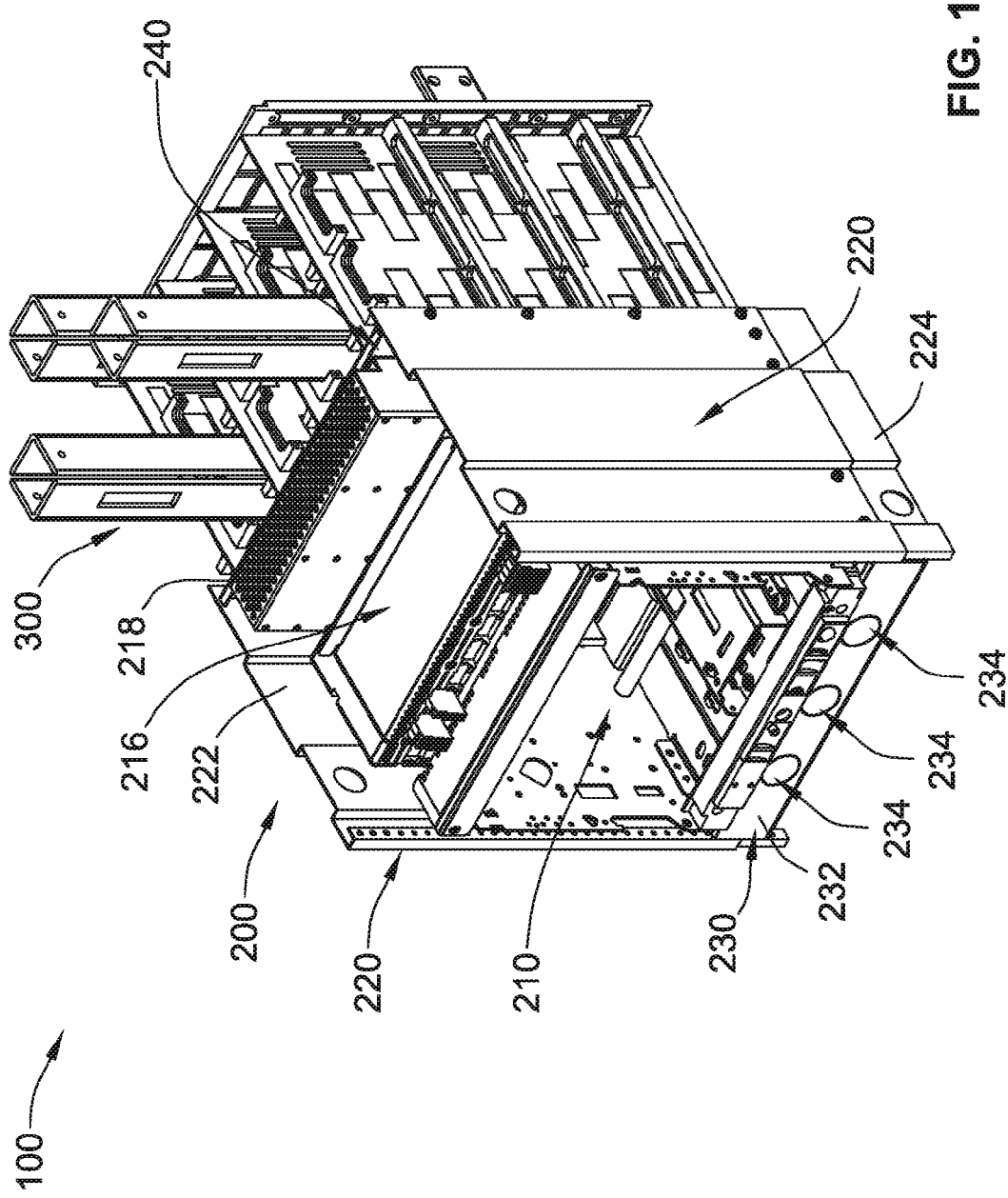
FIG. 1 illustrates a front perspective view of a dual compartment module of a switchgear/board cabinet, in accordance with a first embodiment of the present disclosure.
Figure 2:
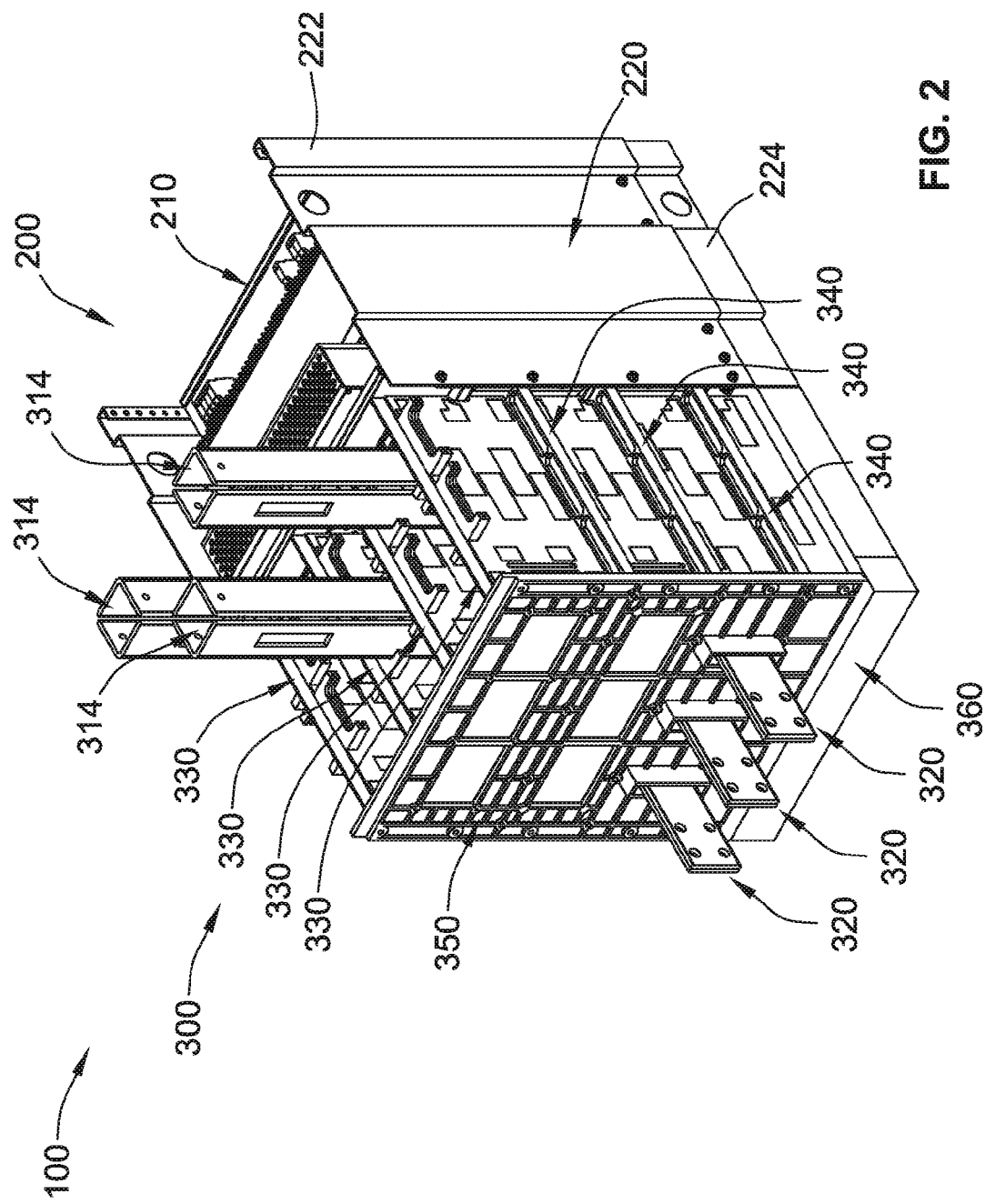
FIG. 2 illustrates a rear perspective view of the dual compartment module of FIG. 1.

FIGS. 1 and 2 illustrate perspective views of a dual compartment module 100 for a switchgear/board cabinet, in accordance with one embodiment of the present disclosure. The module 100 includes an equipment compartment 200 and a bus compartment 300 arranged behind the equipment compartment. The equipment compartment 200 houses switching equipment 210, such as a breaker, here illustrated by a breaker cradle 216, i.e., draw out chassis, for a circuit breaker (not shown).

Figure 3:
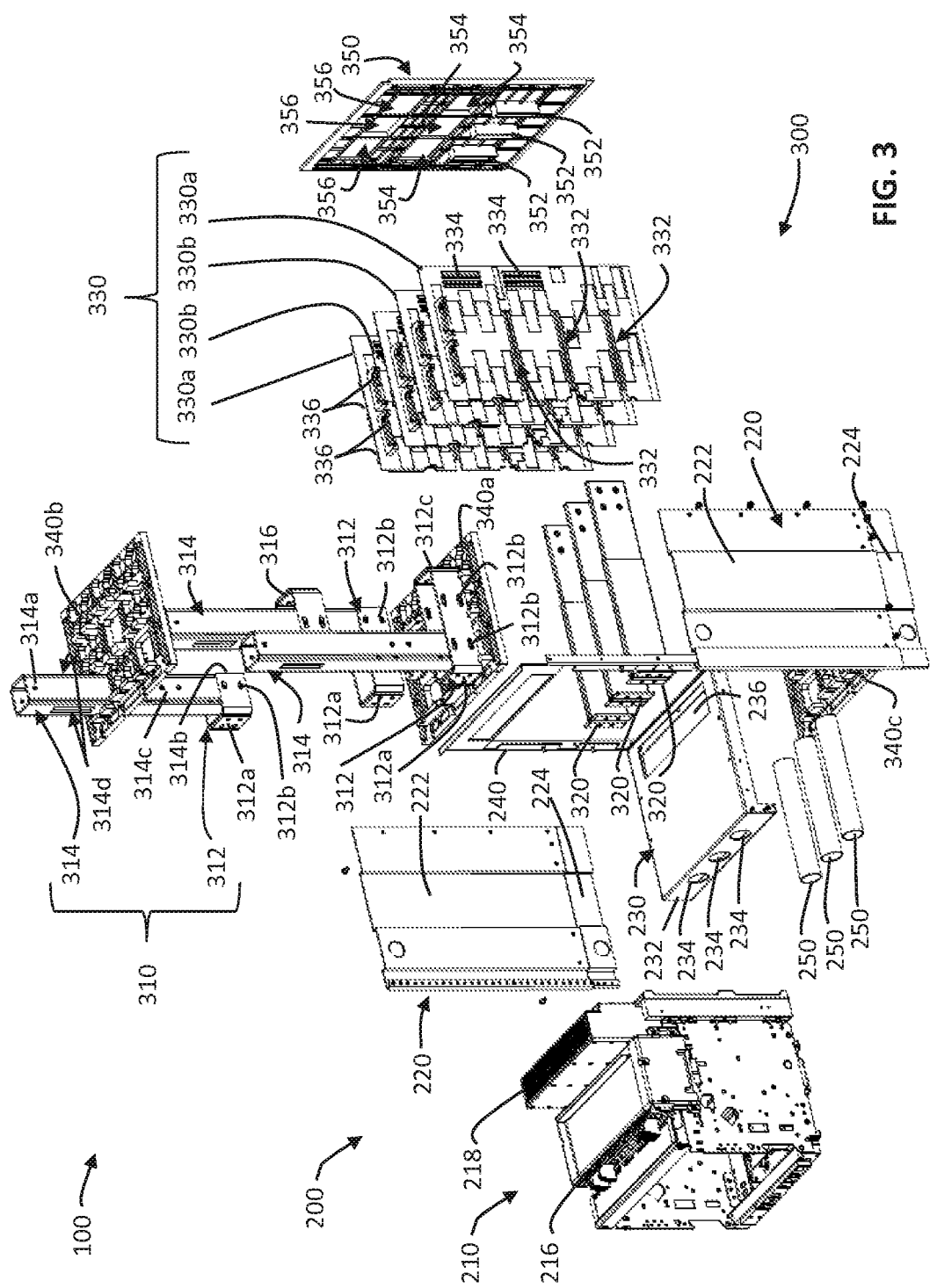
FIG. 3 illustrates a perspective exploded view of the dual compartment module of FIG. 1.
Figure 4:
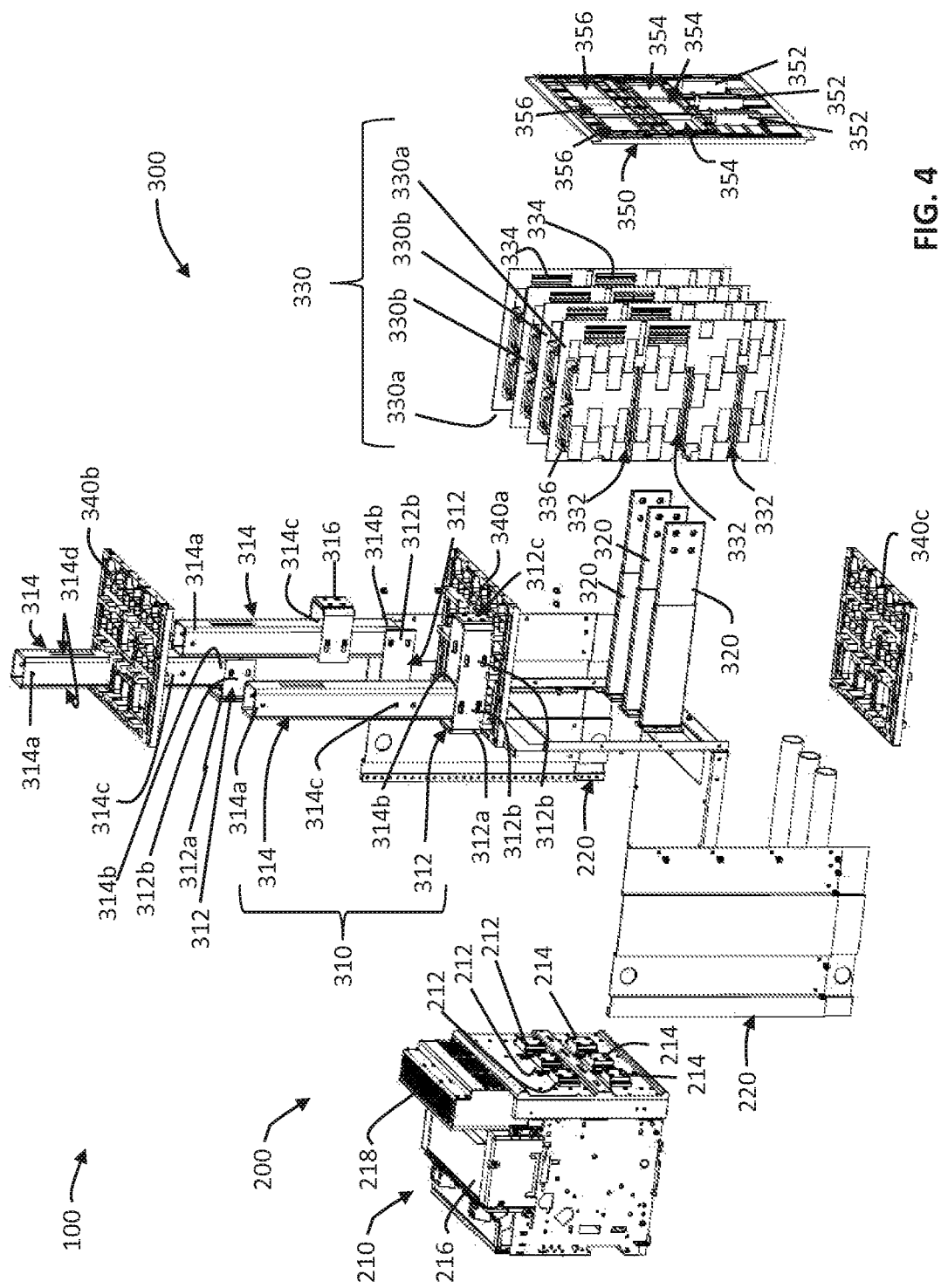
FIG. 4 illustrates another perspective exploded view of the dual compartment module of FIG. 1.

FIGS. 3 and 4 show exploded views of components of the module 100 in FIGS. 1 and 2 in further detail. The bus compartment 300 includes a plurality of line connection buses 310 for interconnecting switching equipment 210 housed in the equipment compartment 200 to multi-phase power lines (not shown), and a plurality of load connection buses 320 for interconnecting the switching equipment to a load. In this example, there are three phases (e.g., phase A, phase B and phase C) for the line connection buses 310 and the load connection buses 320.

As further shown in FIG. 3, the equipment compartment 200 includes two side panels 220, a base support plate 230 and a rear frame 240, which are connected together. Each side panel 220 includes a top portion 222 and a bottom portion 224. The bottom portion 224 of each panel 220 is offset from the rest of the panel, and together forms an offset at a bottom portion of the module 100. The offset allows the module 100 to be stacked onto a top portion of another dual compartment module 100. The base support plate 230 includes a front end 232 that extends downwards and an opening 236. The front end 232 includes a plurality of spaced-apart holes 234, which are also shown in FIG. 1, for engaging vent pipes 250 arranged below the base support plate 230. The switching equipment 210 includes a breaker cradle 216 and a circuit breaker (not shown) supported by the cradle. The equipment compartment 200 also houses an arc blocking system 218. Arc gases, which explode into the arc blocking system 218, are vented out through the top of the system.

As further shown in FIG. 4, the bus compartment 300 includes a conductive line connection bus 310 and a conductive load connection bus 320 for each phase. Each load connection bus 320 has one end for connecting to a load connection terminal 214 of the switching equipment 210 and the other end for connecting to a load cable (not shown). Each line connection bus 310 includes a horizontal bus 312 having one end 312A and an opposite end (or portion) 312B, and may be formed from two L-shaped bars arranged to provide a U-shaped horizontal bus. The opposite end 312A of the horizontal bus 312 is connectable to a corresponding line connection terminal 212 of the switching equipment 210. The horizontal bus 312 may also include a connection terminal 312C if a bus or cable is to be connected to the horizontal bus. In this case, the horizontal bus 310 may be box-shaped with side holes arranged at desired positions (e.g., at an end or portion 312B) along a length of the horizontal bus to allow an end 314B of a vertical riser 314 to be connected to the horizontal bus. Each line connection bus 310 may also include a vertical riser 314 for connecting to the line connection bus 310 of another dual compartment module 100. The vertical riser 314 includes an end 314A, an end 314B, a portion 314C and slots 314D on opposite sides. The portion 314C is connectable to a conductive connection terminal 316. The end 314B is connectable to the end (or portion) 312B of the horizontal bus 312 through holes on both ends by using a fastening device, such as a bolt or screw. The end 314A of the vertical riser also includes holes and may be connected to the end (or portion) 312B of the horizontal bus 312, which may also be connected to the end 314B of the vertical riser of another dual compartment module 100, which is stacked immediately above the module 100. In this way, the line connection buses 310 of two or more stacked modules 100 may be connected together, as shown and discussed in further detail below with reference to FIGS. 8-11.

Figure 7A:
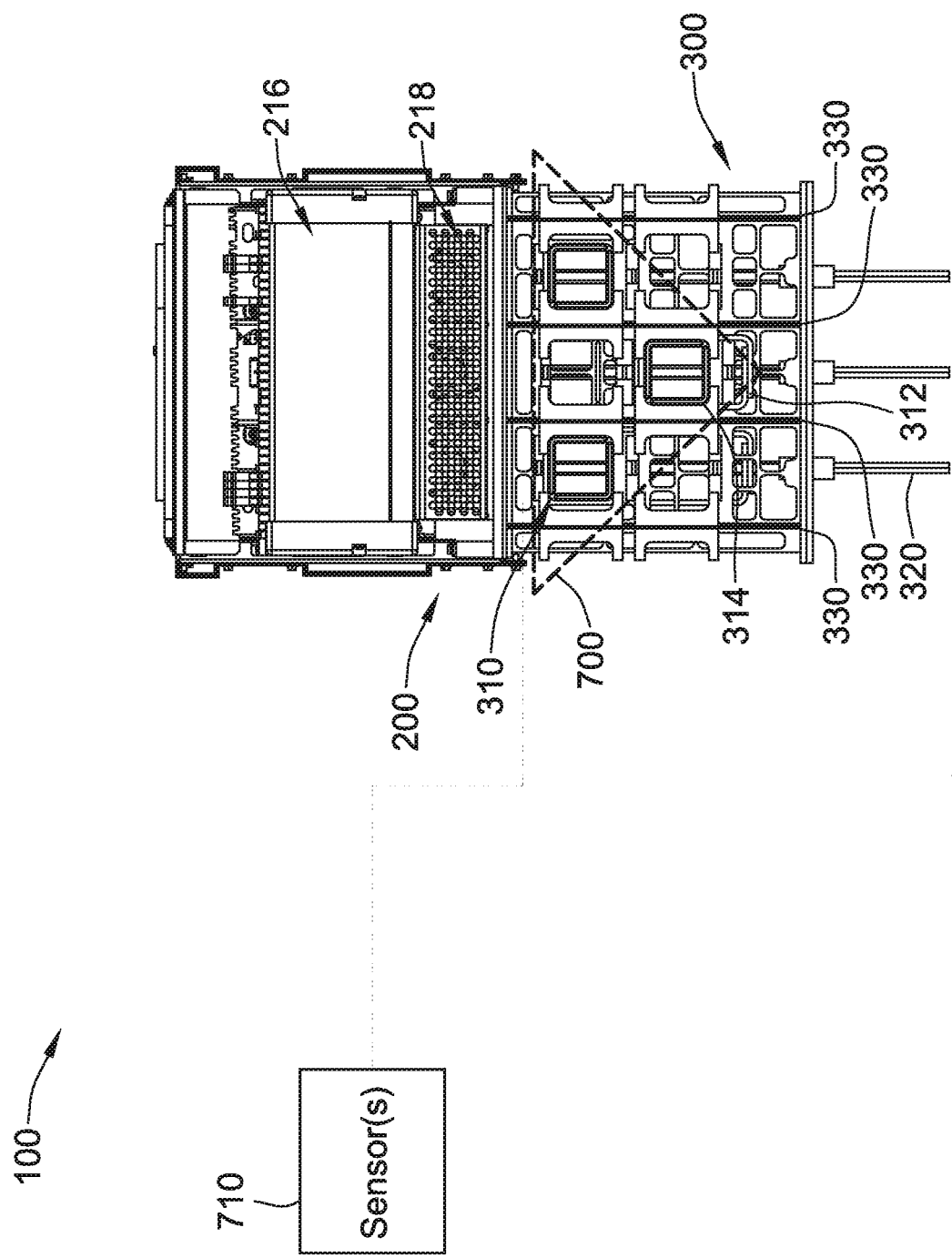
FIG. 7A illustrates a top view of the dual compartment module of FIG. 1 and FIGS. 7B and 7C illustrate views of a line support side and a load support side, respectively, of a horizontal support barrier of the bus compartment.

In this example, the vertical riser 314 includes two V-shaped bars best seen in FIG. 7A, that are arranged to form a square-shaped, hollow bar with slots 314D (shown in FIGS. 3 and 4) on opposite sides to allow a bus bar, such as an insulated portion of the load connection bus 320, to extend through. Although the vertical riser 314 is formed of two separate bars, it may be formed as a unitary component. Furthermore, instead of being square-shaped, the vertical riser 314 may be rotated 45 degrees to provide a diamond-shape with a gap therebetween to allow a bus bar to extend through.

As further shown in FIG. 4, the bus compartment 300 also includes a plurality of spaced-apart vertical interphase barriers 330, a plurality of spaced-apart horizontal support barriers 340, and a rear barrier 350. The rear barrier 350 forms a back wall of the bus compartment. The barriers 330, 340 and 350 are each formed of a non-conductive material. The bus compartment 300 also includes a bottom rail 360, as shown in FIG. 2.

Turning back to FIG. 4, each of the vertical interphase barriers 330 extends from a front to a back of the bus compartment 300, and includes a plurality of spaced-apart slots 332 and one or more vertical riser supports 336. Each vertical interphase barrier 330 may also include a plurality of slots 334 for allowing other buses, such as an insulated portion of a through bus, to extend through to allow for connection of the line connection buses between horizontally adjacent bus compartments, modules or cabinets. Two of the vertical interphase barriers 330A form two opposite side walls of the bus compartment 300, and additional vertical interphase barriers 330B are arranged between each phase. The number of additional vertical barriers 330B depends on the number of phases. The vertical interphase barriers 330 provide electrical and physical isolation of the line connection bus 310 and the load connection bus 320 of each phase from the line connection bus 310 and the load connection bus 320 of the other of the phases.

Figure 7B:
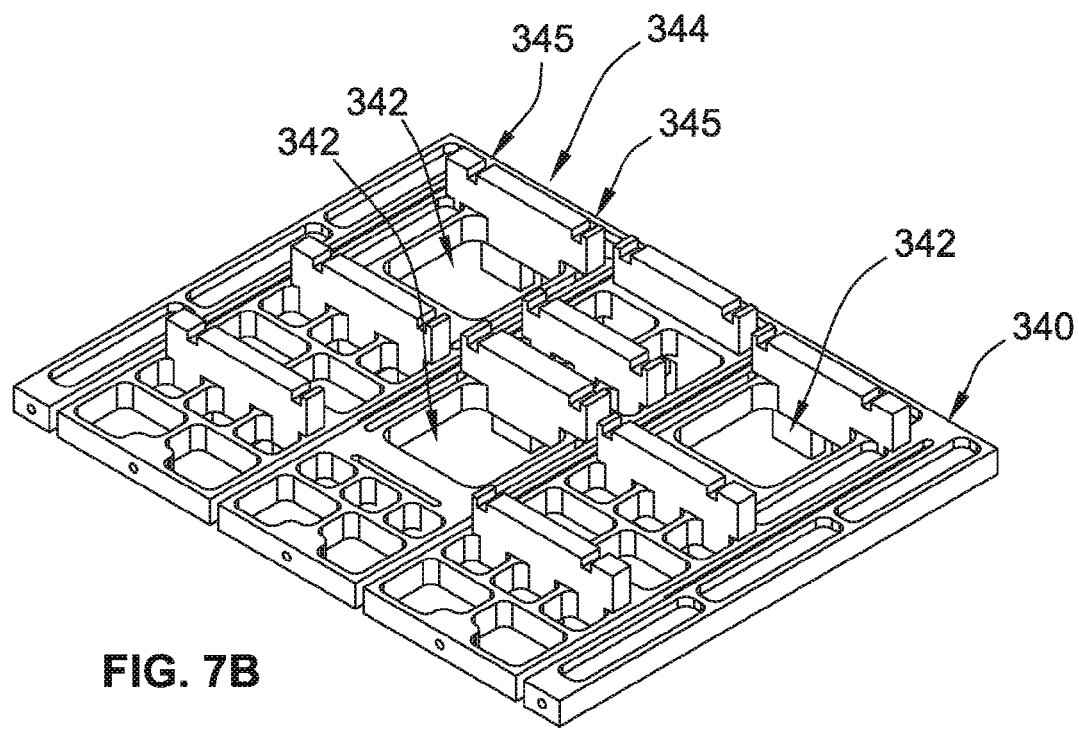
Figure 7C:
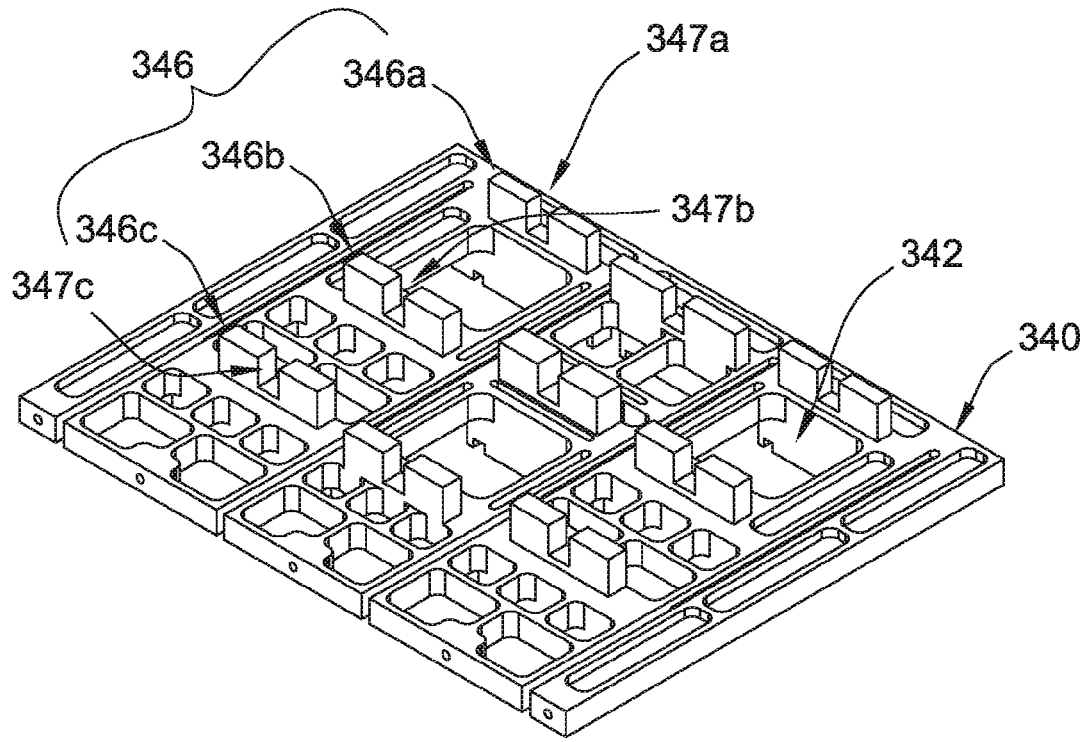

The horizontal support barrier 340 extends from the front to the back of the bus compartment 300, and supports the line connection buses 310. In this example, the bus compartment 300 includes three horizontal support barriers 340a, 340b and 340c, collectively 340. One of the horizontal support barriers 340a supports the horizontal buses 312, and is arranged above the load connection buses 320. A second one of the horizontal support barriers 340b is arranged above the horizontal buses 312. A third one of the horizontal support barriers 340c is arranged below the load connection buses 320. As shown in greater detail in FIGS. 7B and 7C, each of the horizontal support barriers 340 includes one or more line bus supports 344 on a line support side (in FIG. 7B) and one or more load bus supports, collectively 346, on the other side (in FIG. 7C), i.e., a load support side, for each phase. The line bus support 344 extends vertically from the line support side and includes two spaced-apart grooves 345 configured to receive a horizontal bus 312. In this example, each phase includes three load bus supports 346A, 346B and 346C, which extend vertically from the load support side and include grooves 347A, 347B and 347C, respectively, configured to receive a load connection bus 320. Each of the horizontal support barriers 340 also includes openings 342 configured to allow the vertical riser 314 of each phase to extend through, and provides support for the vertical risers when engaged in the module 100.

In this example, for each phase, the horizontal support barriers 340 include a square-shaped opening 342 to receive the square-shaped vertical riser 314. Each horizontal support barrier 340 is also engaged in a corresponding slot 332 (as shown in FIGS. 3 and 4) of the vertical interphase barriers 330. Each horizontal support barrier 340 also includes other openings to allow air flow through the bus compartment 300 to facilitate cooling of the compartment. The size and shape of the openings of the horizontal support barrier 340 may be configured according to customer specifications and other component configurations. For example, the horizontal support barriers 340 may include two V-shaped openings arranged in a diamond-shape, when employing a diamond-shaped vertical riser instead of a square-shaped vertical riser 314; and one end of a horizontal bus may include a Y-shaped connection terminal for connecting to an end of the diamond-shaped vertical riser.

FIG. 5 shows a frontal view of the dual compartment module 100 with the switching equipment 210 housed in the equipment compartment 200. FIG. 6 shows a rear view of the dual compartment module 100. As further shown in FIG. 6, the rear barrier 350 includes a slot 352, a first window 354 and a second window 356 for each phase. The slot 352 is configured to engage a load connection bus 320, and allows a terminal end of the bus 320 to extend out through the rear of the module 300 for connection to a load cable (not shown). The first window 354 provides access to the end (or portion) 312B or a connection terminal 312C of the horizontal bus 312 of the line connection bus 310. If the horizontal bus 312 includes a connection terminal 312C (such as also shown in FIG. 4), the window 354 allows a user to secure an end of a through bus or a power cable to the horizontal bus 312 of the connection bus 310. If the horizontal bus 312 does not include a connection terminal 312C, the window 354 may allow a user to access the end 312B of a horizontal bus 312 and the end 314B of a vertical riser 314 that extends out through a top of the module 100 and/or the end 314A of a vertical riser 314 that extends up through a bottom of the module 100, such as from another module 100 arranged below. The second window 356 provides access to the portion 314C of the vertical riser 314 or a connection terminal 316 connected to the portion 314C, and also allows other buses, such as a through bus, or a power cable to be connected to the vertical riser 314. The through bus may be used to connect the line connection buses of another module 100 or compartment arranged to either sides of the module 100. The windows 354 may be covered with removable, non-conductive window covers 600 to restrict access to and isolate components of each line connection bus 310, such as the end (or portion) 312B of the horizontal bus 312 and the end 314B of the vertical riser 314 or the connection terminal 312C. Likewise, if there are no connections to be made to the portion 314C of the vertical riser 314 or the connection terminal 316, the windows 356 may also be covered with removable, non-conductive window covers 600 to restrict access to and isolate the components of the line connection buses.

FIG. 7A shows a top view of the equipment compartment 200 and the bus compartment 300 of the dual compartment module 100. The vertical interphase barriers 330 isolate the line connection bus 310 and the load connection bus 320 of each of the phases A, B and C. A point at which a vertical riser 314 is connected along a length of the horizontal bus 312 of phase B is farther away (e.g. a longer distance) from the end 312A than a point at which a vertical riser 314 is connected along a length of the horizontal bus 312 of the other phases A and C, which is also shown in FIG. 4. Thus, the end (or portion) 312B of the horizontal bus 312 of phase B (at which a vertical riser 314 is connected) is offset from the end (or portion) 312B of the horizontal bus 312 of the other two phases A and C so that the vertical risers 314 of the three phases are aligned in a triangular orientation in the bus compartment 300, as identified by the reference 700. By offsetting the line connection bus 310 of one phase (e.g., the phase B) from the line connection bus of the other of the phases (e.g., the phases A and C), there are a number of benefits, such as improvements to heat distribution and dissipation in the bus compartment 300, improvements to short circuit withstand requirements and arc fault propagation reduction. Other bus orientations between the vertical risers of the different phases may be employed to offset them so that they are not all aligned together in a straight row. For example, the point at which a vertical riser 314 is connected along a length of the horizontal buses 312 for the phases A and C is farther away from the end 312A than the point at which a vertical riser 314 is connected along a length of the horizontal bus 312 of the phase B, or the point at which a vertical riser 314 is connected along a length of the horizontal buses 312 for each of the phases A, B and C may be staggered at different distances from respective ends 312A.

Furthermore, for each phase, a sensor(s) 710 may be positioned at or around a connection point between the horizontal bus 312 of the line connection bus 310 or between the load connection bus 320 and the switching equipment 210. The sensor 710 may be a thermal indicator monitor, such as a glowing detection sensor. With interphase isolation provided by the vertical interphase barriers 330 and improved heat distribution and dissipation, short circuit withstand rating (without additional bracing) and arc fault propagation reduction provided by the orientation of the vertical risers 314 in the bus compartment 300, the sensor 710 of one phase is subject to less interference from the other phases and the sensor 710 can provide improved monitoring of the phases in the bus compartment.

FIGS. 8, 9, 10 and 11 illustrate different perspective views of a switchgear/board cabinet 800 that is constructed by stacking a plurality of dual compartment modules 100 of FIG. 1. In this example, there are four dual compartment modules 100 stacked one on top of another. Each module 100 includes an offset at the bottom portion (e.g., the bottom portions 224 of the side panels 220 as shown in FIGS. 1-3) that is configured to engage a top portion of another module 100. As further shown in FIG. 11, the line connection bus 310 of each of the modules 100 are connected together for each of the phases A, B and C. For example, for each phase, the vertical riser 314 of the line connection bus 310 of a module 100A is connected to a horizontal bus of a line connection bus 310 of a module 100B stacked on top of the module 100A. The vertical riser 314 of the line connection bus 310 of the module 100B is connected to a horizontal bus of a line connection bus 310 of a module 100C stacked on top of the module 100B. The vertical riser 314 of the line connection bus 310 of the module 100C is connected to a horizontal bus of a line connection bus of a module 100D stacked on top of the module 100C. The module 100D is an uppermost module of the stack and does not include any vertical risers 314 extending from a top of the module. Furthermore, the switchgear/board cabinet 800 may also include through buses 810A, 810B and 810C for connecting phases A, B and C of the line connection buses 310 to corresponding phases of horizontally adjoining bus compartment(s), module(s) or cabinet(s). In this example, the through buses 810A and 810B are connected to phases B and C, respectively, of the module 100A, and the through bus 810A is connected to phase A of the module 100B. The through buses 810A, 810B and 810C, however, may be connected to their respective phases from any one of the modules 100A, 100B, 100C and 100D.

The switchgear/board cabinet 800 may include other compartments. For example, a cable compartment may be connected behind the bus compartment 300 of each of the modules 100 in FIGS. 8-11. The cable compartment may be constructed as a single unit and connected to the stacked modules 100, or each dual compartment module 100 may be constructed with a cable compartment to form a three compartment module. Furthermore, the bus compartment 300 of the module 100 may include additional barriers to further divide the compartment into smaller isolated sections, such as with a cross barrier(s) that extends from one side to the other side of the bus compartment. This may be useful to isolate other components, such as other buses including through buses, if they are provided inside the bus compartment 300 to connect the line connection bus of the module 100 to buses of a module in a horizontally adjacent cabinet.

Furthermore, the equipment compartment 200 houses a breaker cradle 216 for supporting a circuit breaker, but may be used to house other equipment such as instrumentation, transformers or any other equipment typically employed in a switchgear/board cabinet. A length, width and height of each compartment of the module 100 may be configured according to the equipment to be housed in the module.

Figure 12:
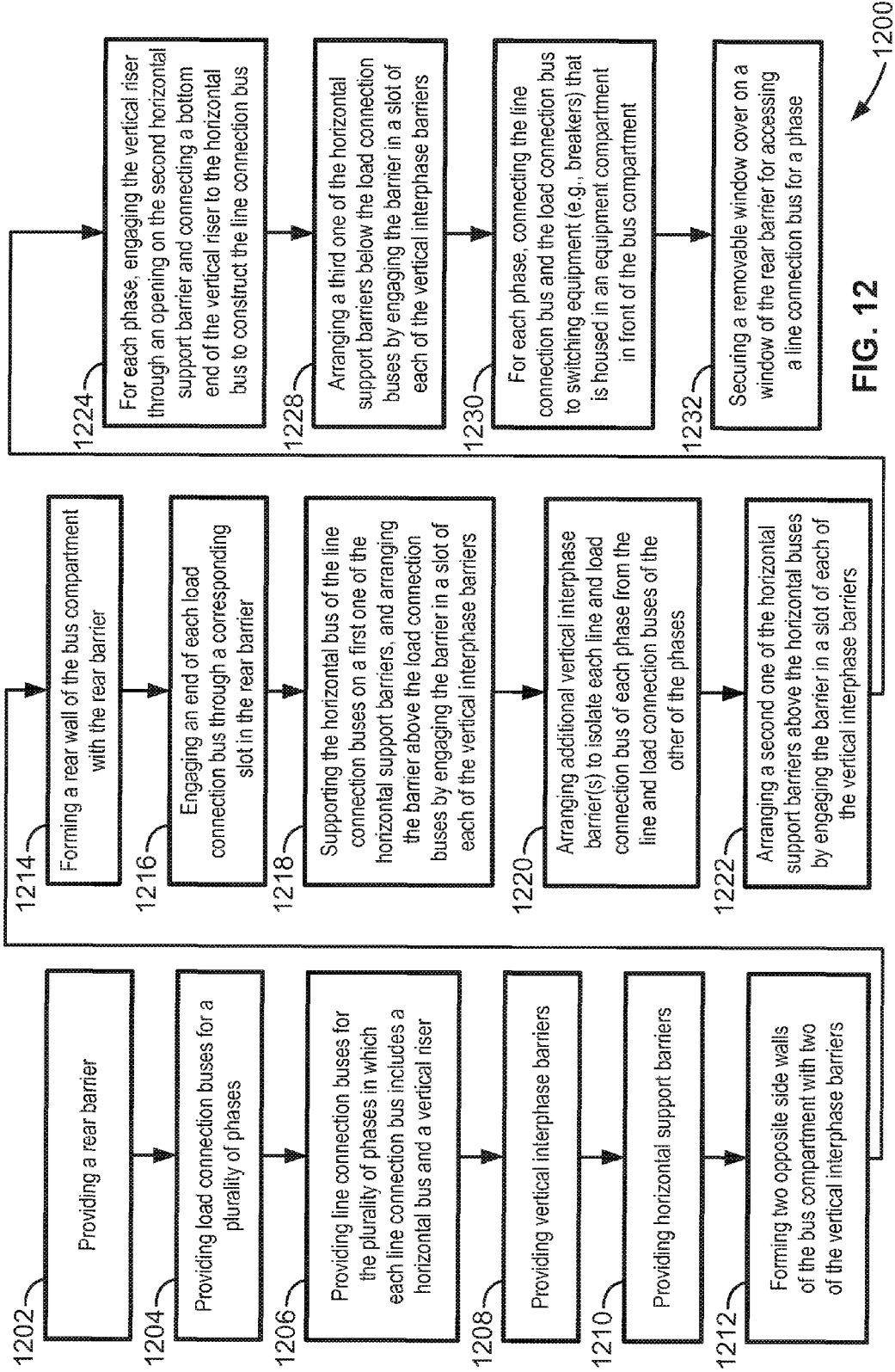
FIG. 12 illustrates an exemplary process by which to construct the bus compartment of the dual compartment module of FIG. 1, in accordance with an embodiment of the present disclosure.

FIG. 12 illustrates an exemplary process 1200 by which to construct a bus compartment of a dual compartment module, such as the module 100 of FIGS. 1-11, in accordance with one embodiment of the present disclosure.

The process 1200 begins by providing components to construct the dual compartment module, at references 1202, 1204, 1206, 1208 and 1210. Those components include a rear barrier 350, load connection buses 320 for a plurality of phases, line connection buses 310 for the plurality of phases, vertical interphase barriers 330 and horizontal support barriers 340. Each line connection bus 310 may include either a horizontal bus 312, or a horizontal bus 312 and a vertical riser 314.

At reference 1212, opposite side walls of the bus compartment 300 are formed with two of the vertical interphase barriers 330A. At reference 1214, a rear wall of the bus compartment is formed with the rear barrier 350. At reference 1216, an end of each load connection bus 320 is engaged through a corresponding slot 352 in the rear barrier 350. Next, at reference 1218, the horizontal bus 312 of the line connection buses 310 are supported on a first one of the horizontal support barriers 340, which is engaged in a slot 332 of each of the vertical interphase barriers 330. The first horizontal support barrier 340 may also be configured to provide support for the load connection buses 320 arranged below. For example, a bottom of the first horizontal support barrier 340 may include a clamping mechanism or a downward extending member with a slot, which holds the load connection bus 320 for a phase.

Next, at reference 1220, additional vertical interphase barrier(s) 330B is arranged to isolate the line connection bus 310 and load connection bus 320 of each phase from the line connection bus 310 and load connection bus 320 of the other of the phases. In a three-phase power system, there would be two vertical interphase barriers 330B, in addition to those that form the side walls, to separate the buses of each of the three phases in the bus compartment 300. At reference 1222, a second one of the horizontal support barriers 340 is arranged above the horizontal buses 312 of the line connection buses 310 by engaging the second horizontal support barrier 340 in a slot 332 of each of the vertical interphase barriers 330.

Thereafter, at reference 1224, for each phase, the vertical riser 314 is engaged through an opening on the second horizontal support barrier 340. A bottom end 314B of the vertical riser 314 is connected to the horizontal bus 312 to construct the line connection bus 310 for each phase. When constructing a dual compartment module 100 for use as an uppermost module of a stack of modules (e.g., a stack as shown in FIGS. 8-11), the line connection bus 310 of each phase may not include a vertical riser 314.

At reference 1228, a third one of the horizontal support barriers 340 is arranged below the load connection buses 320 by engaging the third horizontal support barrier 340 in a slot 332 of each of the vertical interphase barriers 330.

At reference 1230, for each phase, the line connection bus 310 and the load connection bus 320 are connected to switching equipment 210 that is housed in an equipment compartment 200 in front of the bus compartment 300. For example, the buses 310 and 320 may be connected to a circuit breaker, via a breaker cradle 216.

At reference 1232, for each phase, a removable window cover 600 may be secured or removed from a window, e.g., window 354 or 356, of the rear barrier 350 to access or restrict access to the line connection bus 310 of one or more of the phases. Instead of having a separate window on the rear barrier 350 to access the line connection bus 310 for each phase, the rear barrier 350 may include a single window to provide access to the line connection buses 310 of all of the phases and an associated removable window cover.

FIG. 13 illustrates an exemplary process 1300 by which to construct a switchgear/board cabinet using a plurality of dual compartment modules, such as the module 100 of FIGS. 1-11, in accordance with one embodiment of the present disclosure.

At reference 1302, a dual compartment module 100 is constructed with an equipment compartment 200 and a bus compartment 300 arranged behind the equipment compartment. At reference 1304, another dual compartment module 100 is constructed. Next, one of the dual compartment modules 100 is stacked on top of the other of the dual compartment modules 100. Thereafter, the line connection buses 310 of the stacked dual compartment modules 100 are connected together, at reference 1308. A wiring harness may be connected to each of the modules 100 before stacking, or may instead be connected after the modules 100 are stacked. The wiring harness may include cables, such as load cables or power cables, which are bundled together, to allow for ease of connection to the buses of the module 100.

The above processes 1200 and 1300 describe exemplary approaches to constructing a dual compartment module, such as the module shown in FIGS. 1-11, and a switchgear/board cabinet. The various operations of the processes 1200 and 1300, however, may be performed in a different order. The dual compartment module may also be constructed with a different number or combination of components, or a different component size and shape (e.g., such as for the horizontal bus and the vertical riser) which may be dependent on customer specifications. Various mechanisms may also be used to engage or connect the components as well as the compartments 200 and 300 of the dual compartment module to each other, such as tab and slot, tongue and groove, screws, bolts or other fasteners.

Furthermore, to connect the compartments 200 and 300 together, the vertical interphase barriers 330 or the horizontal support barriers 340 of the bus compartment 300 may be connected to the rear frame 240 of the equipment compartment 200. The bottom rail 360 of the bus compartment 300 is connected to the base support plate 230 of the equipment compartment 200 and extends around a base of the bus compartment. The equipment compartment 200 and the bus compartment 300 may also be connected together using other configurations. In addition, the modules 100 are fastened together, such as with bolts, when stacked.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A method of constructing a switchgear/board cabinet, the method comprising:
   constructing a dual compartment module having an equipment compartment and a bus compartment arranged behind the equipment compartment, the bus compartment including:
   a rear barrier forming a back wall of the bus compartment;
   line connection buses for a plurality of phases;
   load connection buses for the plurality of phases;
   spaced-apart vertical interphase barriers extending from a front to a back of the bus compartment, and isolating the load connection bus and line connection bus of each of the plurality of phases from the load connection bus and line connection bus of the other of the plurality of phases; and
   a first horizontal support barrier extending from the front to the back of the bus compartment, and supporting each of the line connection buses, the first horizontal support barrier having one or more openings through which to electrically connect the line connection buses to corresponding line connection buses of another dual compartment module.

2. The method according to claim 1, further comprising:
constructing another of the dual compartment module; and
stacking one of the dual compartment modules on top of the other of the dual compartment modules.

3. The method according to claim 2, wherein stacking comprises:
engaging an offset at a bottom portion of one of the dual compartment modules to a top portion of the other of the dual compartment modules.

4. The method according to claim 1, wherein constructing a dual compartment module comprises:
forming opposite side walls of the bus compartment with two of the vertical interphase barriers.

5. The method according to claim 1, wherein constructing a dual compartment module comprises:
engaging the first horizontal support barrier into a slot of each of the vertical interphase barriers.

6. The method according to claim 1, wherein constructing a dual compartment module comprises:
constructing a line connection bus for each of the plurality of phases to include a vertical riser and a horizontal bus having one end for connecting to switching equipment in the equipment compartment and a second end for connecting to the vertical riser.

7. The method according to claim 6, wherein the plurality of phases comprises three phases, and the vertical risers of the three phases are aligned in a triangular orientation in the bus compartment.

8. The method according to claim 1, wherein constructing a dual compartment module comprises:
engaging an end of each load connection bus through corresponding slots in the rear barrier of the bus compartment.

9. The method according to claim 1, wherein constructing a dual compartment module comprises:
providing a window in the rear barrier to access a line connection bus for one of the plurality of phases in the bus compartment; and
securing a removable cover to the window.

10. The method according to claim 1, wherein constructing a dual compartment module comprises:
providing a base support plate in the equipment compartment, the base support plate having a front end extending downward, the front end including a plurality of spaced-apart holes for engaging corresponding vent pipes arranged below the base support plate.

11. The method according to claim 1, further comprising:
housing a breaker in the equipment compartment.

12. A method of constructing a switchgear/board cabinet, the method comprising:
constructing a dual compartment module having an equipment compartment and a bus compartment arranged behind the equipment compartment, the bus compartment including:
a rear barrier forming a back wall of the bus compartment;
line connection buses for a plurality of phases;
load connection buses for the plurality of phases;
spaced-apart vertical interphase barriers extending from a front to a back of the bus compartment, and isolating the load connection bus and line connection bus of each of the plurality of phases from the load connection bus and line connection bus of the other of the plurality of phases; and
a first horizontal support barrier extending from the front to the back of the bus compartment, and supporting each of the line connection buses,
wherein constructing a dual compartment module comprises:
arranging a second horizontal support barrier above the horizontal buses of the line connection buses in the bus compartment;
engaging the vertical riser for each of the plurality of phases through an opening on the second horizontal support barrier; and
connecting a bottom end of the vertical riser to the horizontal bus for a same phase of each of the plurality of phases.

13. The method according to claim 12, wherein constructing a dual compartment module comprises:
arranging a third horizontal support barrier below the load connection buses.

14. A switchgear/board cabinet comprising:
a dual compartment module having an equipment compartment and a bus compartment arranged behind the equipment compartment, the bus compartment including:
a rear barrier forming a back wall of the bus compartment;
line connection buses for a plurality of phases;
load connection buses for the plurality of phases;
spaced-apart vertical interphase barriers extending from a front to a back of the bus compartment, and isolating the load connection bus and line connection bus of each phase from the load connection bus and line connection bus of the other of the phases; and
a horizontal support barrier extending from the front to the back of the bus compartment, and supporting the line connection buses, the horizontal support barrier having one or more openings through which to electrically connect the line connection buses to corresponding line connection buses of another dual compartment module.

15. The switchgear/board cabinet according to claim 14, further comprising a plurality of the dual compartment modules, the dual compartment modules being stacked one on top of another.

16. The switchgear/board cabinet according to claim 15, wherein one of the plurality of dual compartment modules includes an offset at a bottom portion configured to engage a top portion of another of the plurality of dual compartment modules.

17. A switchgear/board cabinet comprising:
a dual compartment module having an equipment compartment and a bus compartment arranged behind the equipment compartment, the bus compartment including:
a rear barrier forming a back wall of the bus compartment;
line connection buses for a plurality of phases;
load connection buses for the plurality of phases;
spaced-apart vertical interphase barriers extending from a front to a back of the bus compartment, and isolating the load connection bus and line connection bus of each phase from the load connection bus and line connection bus of the other of the phases; and
a horizontal support barrier extending from the front to the back of the bus compartment, and supporting the line connection buses,
wherein the plurality of phases comprises three phases and a line connection bus for each of the plurality of phases includes a vertical riser and a horizontal bus having one end for connecting to switching equipment in the equipment compartment and a second end for connecting to the vertical riser, the second end of the horizontal bus of the line connection bus for one of the three phases being arranged at a position on the horizontal support barrier that is offset from the second end of the horizontal bus of the line connection bus for the other two phases so that the vertical risers of the three phases are aligned in a triangular orientation in the bus compartment.

\* \* \* \* \*